United States Patent
Lee et al.

(10) Patent No.: US 7,597,839 B2
(45) Date of Patent: Oct. 6, 2009

(54) METHOD FOR MANUFACTURING ARTIFICIAL ULTRA-LIGHTWEIGHT AGGREGATE USING RAW SEWAGE SLUDGE

(75) Inventors: Ki-Gang Lee, Gwachon-si (KR); Yoo-Taek Kim, Sungnam-si (KR); Seung-Gu Kang, Yongin-si (KR); Jung-Hwan Kim, Yongin-si (KR); Young-Ho Jeong, Seoul (KR)

(73) Assignee: Kyonggi University Industry & Academia Cooperation Foundation (KR)

( * ) Notice: Subject to any disclaimer, the term of this patent is extended or adjusted under 35 U.S.C. 154(b) by 686 days.

(21) Appl. No.: 11/433,095

(22) Filed: May 13, 2006

(65) Prior Publication Data
US 2007/0040307 A1    Feb. 22, 2007

(30) Foreign Application Priority Data
Aug. 17, 2005   (KR) ............. 10-2005-0075259

(51) Int. Cl.
*B28B 3/20* (2006.01)
(52) U.S. Cl. ............ 264/680; 264/638; 264/639; 264/679
(58) Field of Classification Search ........... 264/638, 264/639, 679, 680
See application file for complete search history.

(56) References Cited

U.S. PATENT DOCUMENTS

| | | | | |
|---|---|---|---|---|
| 4,112,033 A | * | 9/1978 | Lingl | 264/639 |
| 4,874,153 A | * | 10/1989 | Hashimoto et al. | 264/679 |
| 6,440,884 B1 | * | 8/2002 | Devagnanam | 501/141 |
| 2005/0066860 A1 | * | 3/2005 | Logan et al. | 106/745 |
| 2005/0132933 A1 | * | 6/2005 | Blum | 106/739 |
| 2006/0070406 A1 | * | 4/2006 | Raichel et al. | 65/134.8 |
| 2006/0278131 A1 | * | 12/2006 | Hunt | 106/697 |
| 2008/0179253 A1 | * | 7/2008 | Clark et al. | 210/660 |

FOREIGN PATENT DOCUMENTS

KR    11333    8/1996

\* cited by examiner

*Primary Examiner*—Steven P Griffin
*Assistant Examiner*—Russell J Kemmerle, III
(74) *Attorney, Agent, or Firm*—Steven J. Hultquist; Intellectual Property/Technology Law

(57) ABSTRACT

This invention relates to a method for manufacturing an artificial ultra-lightweight aggregate having a specific gravity of 0.8-0.9 using raw sewage sludge. According to the invention, raw sewage sludge and water-free waste are mixed into a blend having a water content that allows the optimal extrusion, whereby excellent ultra-lightweight aggregate which has low water absorption rate and, low slump loss can be produced. In addition, the collective treatment of waste and the mass production of recycled products are possible without addition of a drying process for raw sewage sludge, and thus excellent ultra-lightweight aggregate can be supplied at low cost.

10 Claims, 1 Drawing Sheet

METHOD FOR MANUFACTURING ARTIFICIAL ULTRA-LIGHTWEIGHT AGGREGATE USING RAW SEWAGE SLUDGE

BACKGROUND OF THE INVENTION

1. Field of the Invention

The present invention relates to a method for manufacturing an artificial ultra-lightweight aggregate using raw sewage sludge, and more particularly, to a method for manufacturing an artificial ultra-lightweight aggregate having a specific gravity of 0.8-0.9 using raw sewage sludge, dry steel sludge and clay.

2. Background of the Related Art

Generally, lightweight aggregates mean aggregates having a unit weight of about 0.8-1.2 tonf/m$^3$ as indicated in KSF 2505 (test method for unit weight of aggregate). These lightweight aggregates are broadly divided into natural aggregates and artificial aggregates. In Korea, however, a large amount of natural aggregates in a usable form is not available, and the mass production of artificial lightweight aggregates does not yet meet the demand.

Generally, artificial aggregates are manufactured using raw materials, such as expandable shale, expandable clay, fly ash, and the like, and should satisfy various requirements, including clear appearance, high strength and excellent durability. In addition, the artificial lightweight aggregate should have suitable particle size and unit weight. At the same time, the artificial lightweight aggregate should not contain harmful substances having an adverse effect on concrete and iron materials, and any change in the quality of the artificial lightweight aggregate attributable to manufacturing processes should be small.

Generally, methods for molding lightweight aggregates include injection molding, tape seating and plastic extrusion. Among these molding methods, plastic extrusion is the most economic method for mass production of lightweight aggregates, and particularly, the water content of a clay body in the plastic extrusion is highly important. If the water content exceeds 25%, molded bodies of lightweight aggregates will stick to each other, and if it is less than 20%, the plasticity of the clay body will excessively increase, so that an extruder is overloaded and extrusion becomes impossible.

Recently, studies have been conducted to manufacture eco-friendly aggregates at low cost using industrial wastes, such as fly ash, paper ash, coal fly ash, paper making sludge, waste incinerator fly ash, and wastewater sludge, which are increasingly generated in various industrial fields.

As a result of such studies, methods have been suggested for manufacturing artificial lightweight aggregates by mixing paper making sludge, paper making sludge incinerator fly ash, mining waste rock, sewage sludge or coal fly ash mainly with clay and then sintering the mixture. Examples of these methods include: Korean Patent Publication No. 96-11333, entitled "Artificial Lightweight Aggregate and Manufacturing Method Thereof"; Korean Patent Registration No. 10-208779, entitled "Lightweight Aggregate Having Coating Film Formed on Outer Surface and Manufacturing Method Thereof;" Korean Patent Registration No. 10-240943, entitled "Method for Manufacturing Porous Lightweight Building Material Using Red Mud;" Korean Patent Publication No. 1999-88360, entitled "Method for Manufacturing Artificial Lightweight Aggregate Having Low Specific Gravity Through Control of Dry Specific Gravity." Also, as a prior patent application using sewage sludge, there is Korean Patent Publication No. 2002-0084975, entitled "Method for Manufacturing Calcined Building Material Using Sewage Sludge."

In particular, the prior methods for manufacturing lightweight aggregate using sewage sludge utilize dry sewage sludge, but not raw sewage sludge, and involve excessive energy costs for drying sewage sludge and additional equipment for conducting the drying process, which increases equipment cost, and thereby greatly increases the unit cost of the aggregate product. Thus, these prior methods are not cost-effective and, in fact, hardly put into practical use. Meanwhile, the prior method for manufacturing the calcined building material using sewage sludge employs sewage sludge after drying, but has a shortcoming in that it does not consider water content important for the production of aggregates, because it uses a molding process other than extrusion molding suitable for the production of lightweight aggregates. In addition, the prior technology relating to ultra-lightweight aggregates having a specific gravity of less than 1 is insufficient.

Furthermore, as one of factors of defects caused during cast-in-place concrete construction, water is frequently added to concrete in situ, because the slump loss of concrete occurs during transport. This can result in strength reduction, material separation, drying shrinkage and the like. For this reason, there is a need for the production of aggregate capable of providing concrete that has low slump loss, and thus maintains suitable fluidity for a long period of time.

SUMMARY OF THE INVENTION

The present invention relates to a method for manufacturing an artificial ultra-lightweight aggregate having a specific gravity of 0.8-0.9 using raw sewage sludge.

The above and other objects, features and embodiments of the present invention will be more clearly understood from the following detailed description and the accompanying claims.

DETAILED DESCRIPTION OF THE INVENTION, AND PREFERRED EMBODIMENT

Figure 1:
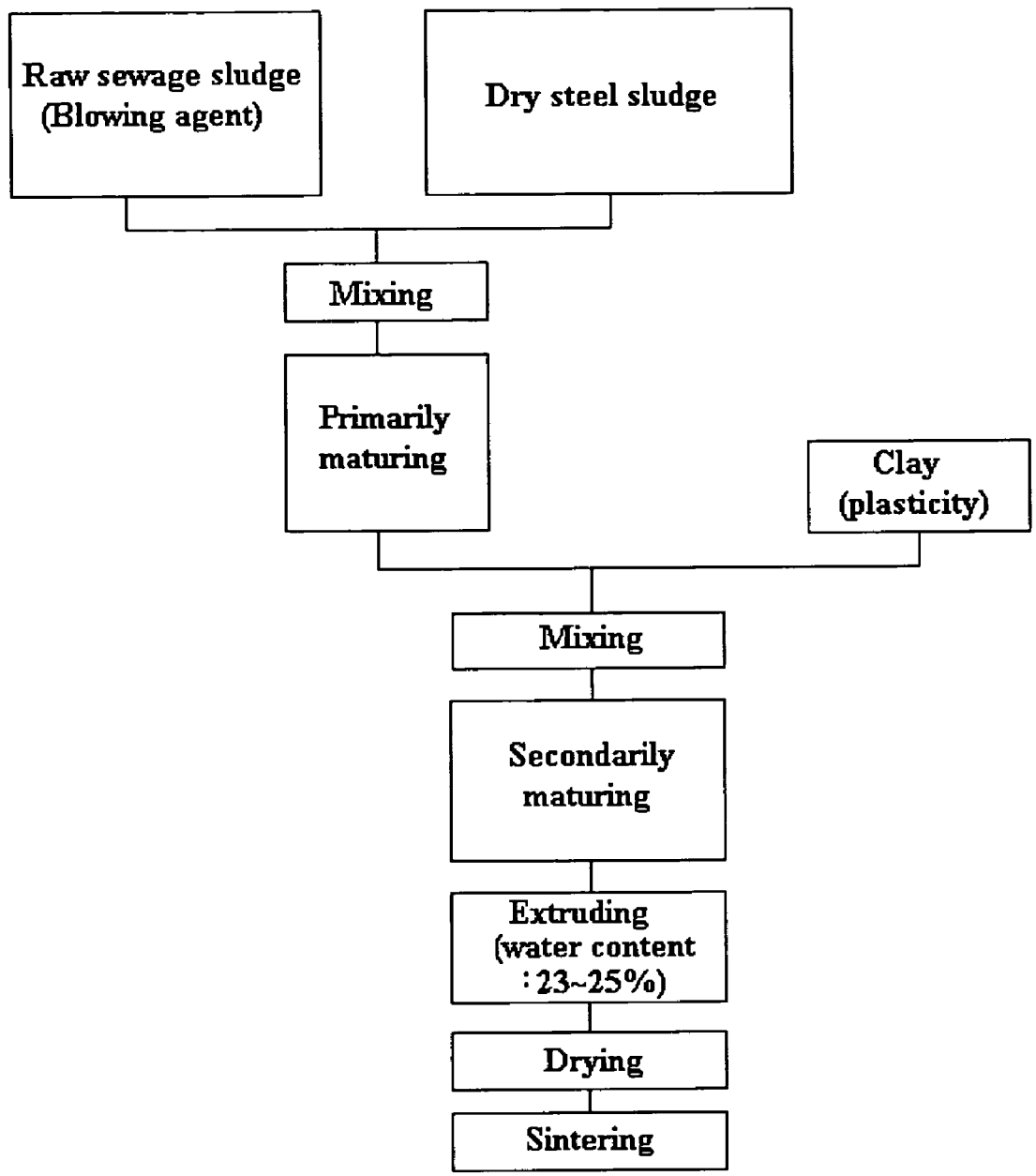
FIG. 1 is a process block diagram for a method for manufacturing an artificial ultra-lightweight aggregate according to one embodiment of the present invention.

The present inventors have made extensive efforts to solve the above-described problems occurring in the prior art and, as a result, found that, when a mixture of raw sewage sludge and dry steel sludge which is dry inorganic waste is primarily matured before being mixed with clay consisting of fine particles, the evaporation of water in the mixture will be made easier than that in a clay-containing mixture, and when the mixture of raw sewage sludge and dry steel sludge is matured for the second time after being mixed with clay, the non-uniform distribution of water in a mixture of waste and clay, which occurs during the natural drying and blending of the raw materials, will be prevented, and thus, raw sewage sludge and water-free waste can be mixed into a blend having a water content allowing the optimal extrusion, whereby excellent ultra-lightweight aggregate having low water absorption rate and slump loss and a specific gravity of 0.8-0.9 can be produced using raw sewage sludge. On the basis of these findings, the present invention has been completed.

The present invention provides a method for manufacturing an artificial ultra-lightweight aggregate having a specific gravity of 0.8-0.9, the method comprising the steps of: (a) mixing raw sewage sludge with dry steel sludge as dry inorganic waste to mature primarily; (b) mixing the primarily matured material with clay to mature secondarily; (c) extruding the secondarily matured material; (d) drying the extruded body; and (e) sintering the dried extruded body.

In the present invention, the contents of said raw sewage sludge and said dry steel sludge in the step (a) are 20-40 parts by weight and 20-30 parts by weight, respectively.

Also, in the present invention, the content of said clay in the step (b) is 30-60 parts by weight.

Referring to the process according to FIG. 1, the raw sewage sludge and dry inorganic waste were mixed together, and the mixture was primarily matured in a maturing silo at room temperature, to which clay was then added to make a clay body. The clay body was secondarily matured in the same manner as the primary maturing step. After the secondary maturing, the clay body was extruded, dried and calcined, thus producing lightweight aggregate.

Hereinafter, the present invention will be described in detail with reference to examples. It will however be obvious to those skilled in the art that these examples are presented to more fully describe the present invention and are not intended to limit the scope of the present invention.

Also, although the following examples illustrate only the effects of lightweight aggregate on water absorption rate and slump loss, those skilled in the art will appreciate from the illustrated results that ultra-lightweight aggregate according to the present invention also shows excellent water absorption rate and slump loss effect.

Example 1

Comparison of Residue after Drying and Residue after Calcination Between Dried Sewage Sludge and Raw Sewage Sludge The residue (%) of dried sewage sludge and the residue (%) of raw sewage sludge were compared with each other using Standard Test Method for Ignition Loss. Residue (%) after drying was obtained by drying the sludge sample in a drier at 200° C. and then measuring the weight of the remaining sample. Residue (%) after calcination was obtained by maintaining the sample at 800° C. for 5 hours to remove organic substances, crystalline water, $CO_2$ and the like, and then cooling and weighing the weight of the remaining sample.

TABLE 1

Comparison of residues after drying and calcination between dried sewage sludge and raw sewage sludge.

|  | Water content (%) | Residue after drying (%) | Residue after calcination (%) |
|---|---|---|---|
| Dried sewage sludge | 14.4 | 85.6 | 40.00 |
| Raw sewage sludge | 79.0 | 16.7 | 6.68 |

As can be seen in Table 1 above, the residue after drying and the residue after calcination were 85.6% and 40.00%, respectively, for dried sewage sludge, and 16.7% and 6.68%, respectively, for raw sewage sludge. This suggests that the use of raw sewage sludge is more effective in making aggregate lightweight, compared to dried sewage sludge.

Example 2

Comparison of Water Content and Extrudability in Relation to Addition Ratios of Raw Sewage Sludge and Dry Inorganic Waste While each of raw sewage sludge (79% water content), collected from a sewage disposal plant, Suwon, Korea, and dry inorganic waste, was added at various ratios, the water content and extrudability between the various ratios was compared.

Experimental group 1 shown in Table 2 was obtained by mixing 150 kg of raw sewage sludge with 850 kg of clay to make 1 ton of a clay body and extruding the clay body.

To produce experimental group 2, 150 kg of raw sewage sludge and 100 kg of dry inorganic waste were mixed together, and the mixture was primarily matured in a maturing silo at room temperature for 24 hour, to which 750 kg of clay was then added to make 1000 kg of a clay body. The clay body was secondarily matured in the same manner as the primary maturing step. Through this maturing procedure, the water content of the clay body was reduced, and the distribution of water content caused by mixing with the dry inorganic waste became uniform. After the secondary maturing, extrusion was performed.

To produce experimental group 3, 200 kg of raw sewage sludge and 200 kg of dry inorganic waste were mixed together, and the mixture was primarily matured in a maturing silo at room temperature for 24 hours, to which 600 kg of clay was then added to make 1 ton of a clay body. The clay body was secondarily matured in the same manner as the primary maturing step and then extruded.

To produce experimental group 4, 300 kg of raw sewage sludge and 200 kg of dry inorganic waste were mixed together and primarily matured for 24 hours, to which 500 kg of clay was then added to make a clay body. The clay body was secondarily matured for 24 hours and then extruded.

To produce experimental group 5, 350 kg of raw sewage sludge and 300 kg of dry inorganic waste were mixed together and primarily matured for 24 hours, to which 350 kg of clay was then added to make a clay body. The clay body was secondarily matured for 24 hours and then extruded.

To produce experimental group 6, 400 kg of raw sewage sludge and 300 kg of dry inorganic waste were mixed together and primarily matured for 24 hours, to which 300 kg of clay was then added to make a clay body. The clay body was secondarily matured for 24 hours and then extruded.

TABLE 2

Comparison of water content and extrudability.

| Experimental group | Water content after maturing for 24 h | Extrudability |
|---|---|---|
| 1 | 25.4 | impossible |
| 2 | 21.4 | possible |
| 3 | 20.1 | possible |
| 4 | 24.5 | possible |
| 5 | 22.7 | possible |
| 6 | 24.7 | possible |

As can be seen in Table 2 above, the case of experimental group 1 where only raw sewage sludge has been added to clay could not be extruded, because the plasticity thereof was low due to a large amount of water contained in the raw sewage sludge. Experimental groups 2 to 6 had a water content of 20-25% and could be extruded. Accordingly, it can be seen that the dry inorganic waste controlled the water content of the clay body containing the raw sewage sludge and ensured the volume stability of the clay body.

Example 3

Comparison of Physical Properties Between Calcined Lightweight Aggregates Produced Using Dry Sewage Sludge and Raw Sewage Sludge (1) According to the method described for experimental group 1 of Example 2, dry sewage sludge and clay were mixed together to make a clay body. The clay body was extruded, dried and calcined, thus producing lightweight aggregate.

In this manner, the following lightweight aggregates were produced: a calcined lightweight aggregate produced using a mixture of 10 wt % dry sewage sludge and 90 wt % clay; a calcined lightweight aggregate produced using a mixture of 30 wt % dry sewage sludge and 70 wt % clay; and a calcined lightweight aggregate produced using a mixture of 50 wt % dry sewage sludge and 50 wt % clay. The physical properties of these lightweight aggregates are shown in Table 3 below.

TABLE 3

Physical properties of calcined lightweight aggregates produced using dry sewage sludge.

| | Calcination temp. (° C.) | | | |
|---|---|---|---|---|
| | 1150 | | 1200 | |
| Experimental group | Specific gravity in saturated surface-dry condition | Water absorption rate (%) | Specific gravity in saturated surface-dry condition | Water absorption rate (%) |
| 11 | 1.39 | 15.70 | 1.28 | 14.29 |
| 12 | 1.60 | 25.22 | 1.55 | 25.74 |
| 13 | 1.57 | 37.88 | 1.53 | 39.08 |

In Table 3, experimental group 1: the calcined lightweight aggregate produced using a mixture of 10 wt % dry sewage sludge and 90 wt % clay; experimental group 12: the calcined lightweight aggregate produced using a mixture of 30 wt % dry sewage sludge and 70 wt % clay; and experimental group 13: the calcined lightweight aggregate produced using a mixture of 50 wt % dry sewage sludge and 50 wt % clay.

(2) According to the method described for experimental group 1 of Example 2, raw sewage sludge and clay were mixed together to make a clay body. The clay body was extruded, dried and calcined, thus producing lightweight aggregate.

In this manner, the following lightweight aggregates were produced: a calcined lightweight aggregate produced using a mixture of 10 wt % raw sewage sludge and 90 wt % clay; a calcined lightweight aggregate produced using a mixture of 30 wt % raw sewage sludge and 70 wt % clay; and a calcined lightweight aggregate produced using a mixture of 50 wt % raw sewage sludge and 50 wt % clay. The physical properties of these lightweight aggregates are shown in Table 4 below.

TABLE 4

Physical properties of calcined lightweight aggregates produced using raw sewage sludge.

| | Calcination temp. (° C.) | | | |
|---|---|---|---|---|
| | 1150 | | 1200 | |
| Experimental group | Specific gravity in saturated surface-dry condition | Water absorption rate (%) | Specific gravity in saturated surface-dry condition | Water absorption rate (%) |
| 21 | 1.40 | 35.93 | 1.54 | 19.15 |
| 22 | 1.57 | 34.07 | 1.36 | 44.27 |
| 23 | 1.51 | 34.78 | 1.30 | 49.02 |

In Table 4, experimental group 21: the calcined lightweight aggregate produced using a mixture of 10 wt % raw sewage sludge and 90 wt % clay; experimental group 22: the calcined lightweight aggregate produced using a mixture of 30 wt % raw sewage sludge and 70 wt % clay; and experimental group 23: the calcined lightweight aggregate produced using a mixture of 50 wt % raw sewage sludge and 50 wt % clay.

(3) According to the same method as described for experimental groups 2-6 of Example 2, raw sewage sludge and dry inorganic waste were mixed together and primarily matured, to which clay was then added to make a clay body. The clay body was secondarily matured, extruded, dried and then calcined, thus producing a lightweight aggregate.

Specifically, lightweight aggregates of experimental groups 31 to 34 shown in Table 5 below were produced by mixing 10 wt % raw sewage sludge with each of 5, 10, 15 and 20 wt % of dry inorganic waste powder, primarily maturing the mixtures, mixing the matured mixtures with 85, 80, 75 and 70 wt % of clay, respectively, secondarily maturing the resulting mixtures, and extruding, drying and calcining the secondarily matured mixtures.

Lightweight aggregates of experimental groups 35 to 38 were produced by mixing 20 wt % of raw sewage sludge with each of 5, 10, 15 and 20 wt % of dry inorganic waste powder, primarily maturing the mixtures, mixing the primarily matured mixtures with 75, 70, 65 and 60 wt % of clay, respectively, secondarily maturing the resulting mixtures, and extruding, drying and calcining the secondarily matured mixtures.

Lightweight aggregates of experimental groups 39 to 42 were produced by mixing 30 wt % of raw sewage sludge with each of 5, 10, 15 and 20 wt % of dry inorganic waste powder, primarily maturing the mixtures, mixing the primarily matured mixtures with 65, 60, 55 and 50 wt % of clay, respectively, secondarily maturing the resulting mixtures, and extruding, drying and calcining the secondarily matured mixtures.

TABLE 5

Physical properties of calcined lightweight aggregates produced using mixture of raw sewage sludge and dry inorganic waster.

| | Calcination temp. (° C.) | | | |
|---|---|---|---|---|
| | 1150 | | 1200 | |
| Experimental group | Specific gravity in saturated surface-dry condition | Water absorption rate (%) | Specific gravity in saturated surface-dry condition | Water absorption rate (%) |
| 31 | 1.39 | 13.6 | 1.23 | 11.6 |
| 32 | 1.49 | 12.9 | 1.31 | 12.3 |

TABLE 5-continued

Physical properties of calcined lightweight aggregates produced using mixture of raw sewage sludge and dry inorganic waster.

| | Calcination temp. (° C.) | | | |
|---|---|---|---|---|
| | 1150 | | 1200 | |
| Experimental group | Specific gravity in saturated surface-dry condition | Water absorption rate (%) | Specific gravity in saturated surface-dry condition | Water absorption rate (%) |
| 33 | 1.53 | 13.0 | 1.45 | 11.0 |
| 34 | 1.56 | 11.1 | 1.42 | 10.9 |
| 35 | 1.41 | 13.1 | 1.26 | 12.5 |
| 36 | 1.48 | 12.2 | 1.35 | 12.9 |
| 37 | 1.53 | 13.2 | 1.39 | 11.0 |
| 38 | 1.65 | 11.5 | 1.50 | 11.9 |
| 39 | 1.31 | 14.9 | 1.11 | 13.7 |
| 40 | 1.41 | 13.4 | 1.18 | 14.2 |
| 41 | 1.59 | 11.6 | 1.38 | 12.1 |
| 42 | 1.57 | 14.1 | 1.50 | 12.1 |

As can be seen from test results shown in Tables 3, 4 and 5 above, the lightweight aggregates produced using the mixture of raw sewage sludge and dry inorganic waste showed a remarkable reduction in water absorption rate. This suggests that the lightweight aggregates produced according to the present invention are the most excellent aggregates.

Example 4

Comparison of Slump Loss

Slump loss was measured for the following aggregates produced in Example 3: the calcined lightweight aggregates of experimental groups 11 and 12, produced using dry sewage sludge; the calcined lightweight aggregates of experimental groups 21 and 22, produced using raw sewage sludge; and the calcined lightweight aggregates of experimental groups 34 and 42, produced using a mixture of raw sewage sludge and dry inorganic waster. The measurement results are shown in Table 6 below.

TABLE 6

Test results for slump loss of lightweight concrete of produced aggregates.

| | Water absorption rate (%) | | | | | | |
|---|---|---|---|---|---|---|---|
| Experimental group | Dried sewage sludge | Raw sewage sludge | Dust etc. | Slump loss (cm) | | | |
| | | | | 0 | 30 min | 60 min | 90 min |
| 11 | 14.29 | | | 24 | 17 | 16 | 13 |
| 12 | 25.74 | | | 23 | 19 | 16 | 21 |
| 21 | | 19.15 | | 21 | 12 | 10 | 8 |
| 22 | | 44.27 | | 21 | 11 | 9 | 6 |
| 34 | | | 10.9 | 24 | 21 | 17 | 17 |
| 42 | | | 12.1 | 33 | 19 | 17 | 16 |

As shown in Table 6 above, the water absorption rate of artificial lightweight aggregate had a close connection with the slump loss of concrete prepared using the aggregate. With a time-lapse of 90 min from 0 min, experimental groups 34 and 42 having low water absorption rate showed a slump loss of about 7 cm, from 24 cm and 23 cm to 17 cm and 16 cm, respectively, which are lower than slump losses of 11, 12, 13 and 15 cm for the other experimental groups 11, 12, 21 and 22. Accordingly, it can be seen that the artificial lightweight aggregates produced by calcining the mixture of raw sewage sludge and dry inorganic waste also had low slump loss, indicating that it is the most excellent artificial lightweight aggregates with high volume stability.

Example 5

Comparison of Physical Properties Between Calcined Ultra-Lightweight Aggregates Using Raw Sewage Sludge From Examples 1 to 4 above, it could be found that the lightweight aggregates produced using dry inorganic waste, such as cast iron dust, marble dust or incinerated industrial waste, had excellent effects. As shown in chemical compositions of Table 7 below, when dry steel sludge containing a large amount of $Fe_2O_3$ was added as the dry inorganic waste, it was possible to produce an ultra-lightweight aggregate having the above-described effect of lightweight aggregate and also a specific gravity of less than 1. Although Examples 1 to 4 above illustrated only the effects of the lightweight aggregates on water absorption rate and slump loss, it is obvious to those skilled in the art that the inventive ultra-lightweight aggregates also have excellent effects on water absorption rate and slump loss.

TABLE 7

Chemical compositions of raw sewage sludge and dry inorganic waste.

| | Lg loss | $SiO_2$ | $Al_2O_3$ | $Fe_2O_3$ | CaO | MgO | $Na_2O$ | $K_2O$ | $TiO_2$ | $P_2O_3$ | $Cr_2O_3$ | MnO |
|---|---|---|---|---|---|---|---|---|---|---|---|---|
| Sewage sludge | 93.42 | 3.12 | 1.35 | 0.58 | 0.39 | 0.12 | 0.07 | 0.17 | 0.05 | 0.64 | — | — |
| Cast iron dust | 26.93 | 55.87 | 8.87 | 2.24 | 1.77 | 1.46 | 1.53 | 0.73 | 0.29 | — | — | — |
| Dry steel sludge | 10.37 | 4.44 | 1.28 | 92.20 | 6.15 | 1.00 | 0.10 | 0.15 | 0.10 | 0.17 | 0.08 | 1.37 |
| Marble dust | 62.54 | 0.24 | 36.77 | 0.02 | 0.01 | 0.01 | 0.02 | 0.03 | 0.12 | 0.04 | — | 0.03 |
| Fly ash | 32.69 | 1.39 | 5.34 | 0.11 | 59.42 | 0.30 | 0.06 | 0.02 | 0.03 | 0.08 | — | 0.02 |

An ultra-lightweight aggregate of experimental group 51 shown in Table 8 below was produced by mixing 20 wt % of raw sewage sludge with 20 wt % of dry steel sludge as the dry inorganic waste, primarily maturing the mixture, adding 60 wt % of clay to the primarily matured mixture, secondarily maturing the resulting mixture, and extruding, drying and calcining the secondarily matured material.

An ultra-lightweight aggregate of experimental group 52 was produced by mixing 30 wt % of raw sewage sludge with 20 wt % of dry steel sludge as the dry inorganic waste, primary maturing the mixture, adding 50 wt % of clay to the primarily matured mixture, secondarily maturing the resulting mixture, and extruding, drying and calcining the secondarily matured material.

An ultra-lightweight aggregate of experimental group 53 was produced by mixing 40 wt % of raw sewage sludge with 30 wt % of dry steel sludge as the dry inorganic waste, primarily maturing the mixture, adding 30 wt % of clay to the primarily matured mixture, secondarily maturing the resulting mixture, and extruding, drying and calcining the secondarily matured material.

TABLE 8

Physical properties of ultra-lightweight aggregates produced by calcining mixture of raw sewage sludge and dry inorganic waste.

| Experimental group | Specific gravity in absolute dry condition Calcination temp. (° C.) | |
|---|---|---|
| | 1150 | 1200 |
| 51 | 0.89 | 0.81 |
| 52 | 0.90 | 0.86 |
| 53 | 0.84 | 0.90 |

As shown in Table 8 above, the ultra-lightweight aggregate having a specific gravity of less than 1 was produced according to the present invention. The ultra-lightweight aggregate could be produced due to oxygen generated from the reduction of a large amount of iron contained in dry steel sludge added together with raw sewage sludge.

As described above in detail, the present invention provides the method for manufacturing the ultra-lightweight aggregate having a specific gravity of 0.8-0.9 using raw sewage sludge. According to the present invention, since raw sewage sludge and dry steel sludge as dry inorganic waste are mixed with each other and primary matured, the evaporation of water in the mixture is more easily achieved compared to that in a clay-containing material. Also, since the waste mixture is secondary matured after being mixed with clay, the non-uniform distribution of water in waste and clay, which can occur during the natural drying and blending of the raw materials, is prevented. Accordingly, raw sewage sludge and dry steel sludge as dry inorganic waste can be mixed into a blend having a water content that allows the optimal extrusion, whereby excellent ultra-lightweight aggregate which has low water absorption rate and therefore, low slump loss, and a specific gravity of 0.8-0.9, can be produced. In addition, the collective treatment of waste and the mass production of recycled products are possible without addition of a drying process for raw sewage sludge, and thus excellent ultra-lightweight aggregate can be supplied at low cost.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

What is claimed is:

1. A method for manufacturing an artificial ultra-lightweight aggregate having a specific gravity of 0.8-0.9, the method comprising the steps of:
   (a) mixing raw sewage sludge with dry steel sludge as dry inorganic waste, and primarily maturing the mixture;
   (b) mixing the primarily matured material with clay, and secondarily maturing the clay-containing mixture;
   (c) extruding the secondarily matured material;
   (d) drying the extruded body; and
   (e) sintering the dried extruded body.

2. The method for manufacturing an artificial ultra-lightweight aggregate having a specific gravity of 0.8-0.9 according to claim 1, wherein the contents of said raw sewage sludge and said dry steel sludge in the step (a) are 20-40 parts by weight and 20-30 parts by weight, respectively.

3. The method for manufacturing an artificial ultra-lightweight aggregate having a specific gravity of 0.8-0.9 according to claim 1, wherein the contents of said clay in the step (b) is 30-60 parts by weight.

4. A method for manufacturing an aggregate, comprising:
   mixing raw sewage sludge with dry steel sludge to form a sludge mixture;
   maturing the sludge mixture to form a matured sludge mixture;
   adding clay to the matured sludge mixture to form a clay/sludge mixture;
   maturing the clay/sludge mixture to form a matured clay/sludge mixture;
   extruding the matured clay/sludge mixture to form an extrudate;
   drying the extrudate to form a dried extrudate; and
   calcining the dried extrudate to yield said aggregate.

5. The method of claim 4, wherein the maturing of the sludge mixture comprises retention of the sludge mixture in a maturing silo.

6. The method of claim 5, wherein said sludge mixture is retained in the maturing silo at room temperature.

7. The method of claim 4, wherein the maturing of the clay/sludge mixture comprises retention of the clay/sludge mixture in a maturing silo.

8. The method of claim 4, wherein the maturing of the clay/sludge mixture reduces water content thereof.

9. The method of claim 4, conducted without drying of the raw sewage sludge.

10. The method of claim 4, wherein the aggregate as a specific gravity in a range of from 0.8-0.9.

* * * * *